(12) United States Patent
Kawakami et al.

(10) Patent No.: US 10,438,747 B2
(45) Date of Patent: Oct. 8, 2019

(54) MULTILAYER ELECTRONIC COMPONENT

(71) Applicant: Murata Manufacturing Co., Ltd., Nagaokakyo-shi, Kyoto-fu (JP)

(72) Inventors: Tetsuo Kawakami, Nagaokakyo (JP);
Takahiro Hirao, Nagaokakyo (JP);
Tsutomu Tanaka, Nagaokakyo (JP);
Tomohiro Kageyama, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 15/911,244

(22) Filed: Mar. 5, 2018

(65) Prior Publication Data
US 2018/0277305 A1    Sep. 27, 2018

(30) Foreign Application Priority Data
Mar. 21, 2017    (JP) ................. 2017-053866

(51) Int. Cl.
*H01G 4/232* (2006.01)
*H01G 4/012* (2006.01)
*H01G 4/30* (2006.01)
*H01G 4/008* (2006.01)
*H01G 4/242* (2006.01)

(52) U.S. Cl.
CPC ........... *H01G 4/2325* (2013.01); *H01G 4/008* (2013.01); *H01G 4/012* (2013.01); *H01G 4/232* (2013.01); *H01G 4/30* (2013.01); *H01G 4/242* (2013.01)

(58) Field of Classification Search
CPC ........ H01G 4/38; H01G 4/012; H01G 4/1227; H01G 21/4857; H01G 21/486; H01G 23/49822; H01G 23/49827; H01G 23/49838

USPC ......................................................... 361/303
See application file for complete search history.

(56) References Cited

U.S. PATENT DOCUMENTS

| | | | |
|---|---|---|---|
| 2002/0158307 A1* | 10/2002 | Honda | H01G 4/232 257/532 |
| 2003/0159783 A1 | 8/2003 | Kakimoto et al. | |
| 2006/0152886 A1 | 7/2006 | Togashi et al. | |

FOREIGN PATENT DOCUMENTS

| | | |
|---|---|---|
| CN | 1805087 A | 7/2006 |
| JP | 2002-100543 A | 4/2002 |
| JP | 2003-257769 A | 9/2003 |
| JP | 2003-297669 A | 10/2003 |

(Continued)

OTHER PUBLICATIONS

Official Communication issued in Japanese Patent Application No. 2017-053866, dated Aug. 6, 2019.

*Primary Examiner* — Michael P McFadden
(74) *Attorney, Agent, or Firm* — Keating & Bennett, LLP (57) ABSTRACT

A multilayer electronic component includes first, second, and third ceramic layers, first and second inner electrodes, and a via-electrode. The first, second and third ceramic layers are sequentially stacked on each other. The first inner electrode is sandwiched between the first and second ceramic layers. The second inner electrode is sandwiched between the second and third ceramic layers. The via-electrode electrically connects the first and second inner electrodes. A projection is integrally provided with the via-electrode. The projection projects from the via-electrode towards an outer peripheral direction and is inserted into the second ceramic layer in a layered arrangement.

13 Claims, 7 Drawing Sheets

(56) References Cited

FOREIGN PATENT DOCUMENTS

| | | | |
|---|---|---|---|
| JP | 2005-340437 | A | 12/2005 |
| JP | 2007-013253 | A | 1/2007 |
| JP | 2007-053206 | A | 3/2007 |
| JP | 2007-059708 | A | 3/2007 |
| JP | 2008-283166 | A | 11/2008 |
| JP | 2009-147160 | A | 7/2009 |
| JP | 2011-049417 | A | 3/2011 |
| JP | 2011-249452 | A | 12/2011 |
| JP | 2013-135178 | A | 7/2013 |

* cited by examiner

MULTILAYER ELECTRONIC COMPONENT

CROSS REFERENCE TO RELATED APPLICATIONS

This application claims the benefit of priority to Japanese Patent Application No. 2017-053866 filed on Mar. 21, 2017. The entire contents of this application are hereby incorporated herein by reference.

BACKGROUND OF THE PRESENT INVENTION

1. Field of the Present Invention

The present invention relates to a multilayer electronic component. More particularly, the present invention relates to a multilayer electronic component including at least three ceramic layers, at least two inner electrodes sandwiched between the corresponding ceramic layers, and a via-electrode electrically connecting the inner electrodes.

2. Description of the Related Art

In a typical multilayer electronic component, via-electrodes (may alternatively be conductive posts or through-holes) are formed to connect a circuit on a certain layer and a circuit formed on a layer above or below this certain layer.

In the multilayer wiring substrate block disclosed in Japanese Unexamined Patent Application Publication No. 2005-340437, via-electrodes are formed by a droplet ejecting process, such as an inkjet process. The substrate used in this multilayer wiring substrate block is a resin substrate made of polyimide, for example. At the final stage of the manufacturing process, the via-electrodes linearly contact the substrate in a sectional view.

Figure 7A:
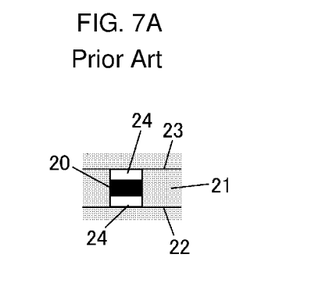
FIGS. 7A and 7B are sectional views of via-electrodes and ceramic elements according to examples of the related art.
Figure 7B:
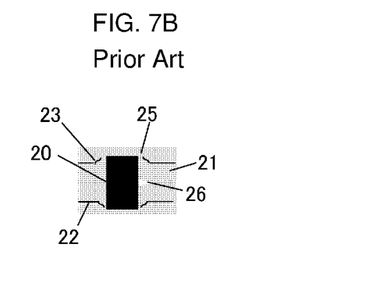
Figure 8A:
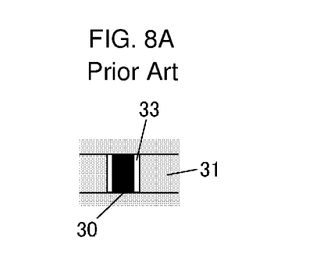
FIGS. 8A and 8B are sectional views of via-electrodes and ceramic elements according to examples of the related art.
Figure 8B:
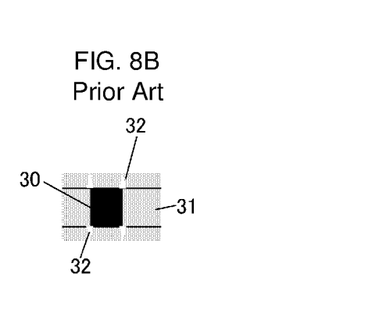
Figure 9:
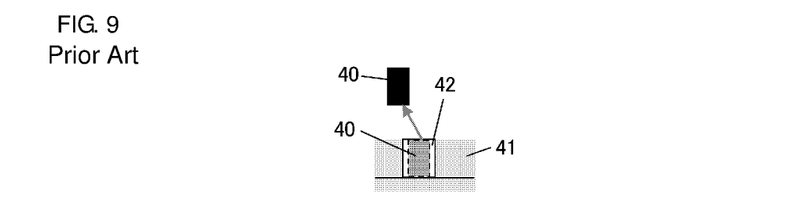
FIG. 9 is a sectional view of a via-electrode and a ceramic element according to an example of the related art.

In the case of an electronic component body defined by a ceramic element, the contraction coefficient of the via-electrodes and that of the ceramic element during a firing process are different. Because of this difference in the contraction coefficient, the thickness of a via-electrode 20 may become smaller than that of a ceramic element 21, as shown in FIG. 7A, or become larger than that of the ceramic element 21, as shown in FIG. 7B. As a result, gaps 24 may be formed between a circuit 22 on a certain layer and a circuit 23 on the layer above or below the circuit 22, or a break 25 or a crack 26 may occur at a connecting portion between the via-electrode 20 and the ceramic element 21. Additionally, a via-electrode 30 may become smaller than the hole formed in a ceramic element 31, as shown in FIG. 8A, or become larger than the hole formed in the ceramic element 31, as shown in FIG. 8B. Thus, a gap 33 may be formed between the via-electrode and the ceramic element 31 or a crack 32 may occur in the ceramic element 31. As shown in FIG. 9, a via-electrode 40 becomes smaller, and thus, a gap 42 is formed between the via-electrode 40 and a ceramic element 41. In this case, if the via-electrode 40 extends to the external surface of the electronic component, it may fall out of the hole in the ceramic element 41.

In Japanese Unexamined Patent Application Publication No. 2011-249452, a sealing resin layer is formed on a base substrate, and via-electrodes are formed in this sealing resin layer in a bellows shape in cross section by an inkjet process. However, if a ceramic element is replaced by the sealing resin layer, the via-electrodes do not linearly contact the ceramic element because of their bellows curved shape. If the via-electrodes become smaller during the firing process due to the difference in the contraction coefficient, it is likely to detach from the ceramic element. As a result, gaps may be formed between the via-electrodes and the ceramic element.

SUMMARY OF THE PRESENT INVENTION

Accordingly, preferred embodiments of the present invention provide multilayer electronic components in which the occurrence of breaks and cracks is reduced by improving the coupling force between a via-electrode and a ceramic element, and also provide manufacturing methods for the multilayer electronic components.

According to a preferred embodiment of the present invention, a multilayer electronic component includes first, second, and third ceramic layers, first and second inner electrodes, and a via-electrode. The first, second, and third ceramic layers are sequentially stacked on each other. The first inner electrode is sandwiched between the first and second ceramic layers. The second inner electrode is sandwiched between the second and third ceramic layers. The via-electrode electrically connects the first and second inner electrodes. A projection is integrally provided with the via-electrode. The projection projects from the via-electrode towards an outer peripheral direction and is inserted into the second ceramic layer in a layered structure.

In this multilayer electronic component, the projection provided outside the periphery of the via-electrode is inserted into the second ceramic layer in a layered structure. The via-electrode and the second ceramic layer are, thus, engaged with each other and are firmly and integrally fixed with each other. It is, thus, possible to reduce the occurrence of breaks in the inner electrodes, cracks in the ceramic layers, and gaps between the via-electrode and the ceramic layers, and also to prevent the via-electrode from detaching from or falling out of the multilayer electronic component, even with the difference in the contraction coefficient between the via-electrode and the ceramic element of the ceramic layers during the firing process.

The projecting length of the projection may preferably be greater than the thickness of a base portion of the projection. That is, the projection may have a flat or substantially flat shape. With this configuration, the projection and the second ceramic layer contact each other by a large area so as to increase the coupling force therebetween. It is, thus, possible to more effectively reduce the occurrence of cracks and gaps between the via-electrode and the ceramic layers.

"The projection projects from the via-electrode toward an outer peripheral direction" refers to a state in which the projection radially projects outward as viewed from the axial direction of the via-electrode if the configuration of the via-electrode has a circular or substantially circular cross-section. The projection does not have to be a flange shape in which it projects in all directions from the via-electrode. Instead, the projection may partially project in a certain direction from the via-electrode. The configuration of the via-electrode in cross section is not restricted to a circle, and may be structured as desired, such as a substantial quadrilateral or an ellipse, for example. The configuration of the projection in a plan view may also be structured as desired. The via-electrode may extend to both or one of the top and bottom surfaces of the electronic component and may be electrically connected to an external circuit. The via-electrode may not extend to the top and bottom surfaces. A plurality of projections may be inserted into the second ceramic layer. In this case, the lengths of the plurality of projections may not necessarily be uniform. If another inner electrode is provided within the second ceramic layer on the same level as the projection, the leading end of the projection is preferably separated from this inner electrode by a certain distance close enough to maintain a sufficient level of the electrical characteristics and the reliability.

The thickness of the projection may be uniform from the base portion to the leading portion of the projection. Alternatively, the projection may have a wedge or substantially wedge shape such that the thickness of the projection decreases from the base portion to the leading portion. The projection may be curved from the base portion to the leading portion. That is, the projection may not necessarily be straight, but may be curved in the thickness direction. If the second ceramic layer is curved, the projection may also be curved accordingly. The projection may not necessarily extend perpendicularly or substantially perpendicularly to the axial direction of the via-electrode. Instead, the projection may project obliquely with respect to the planes of the inner electrodes. In this case, the projection may not necessarily project in the uniform oblique direction.

Various ceramic materials, such as a dielectric material, a magnetic material, and a piezoelectric material, may be used for the ceramic layers. The conductive material for the via-electrode may be Ni, Ag, Pd, Au, or Cu or an alloy including some of these metals as a primary component. The via-electrode may include a nonconductive material, such as resin or glass. That is, the via-electrode may be a metal composite electrode.

The inner electrodes and the via-electrode may include the same or similar ceramic material (common material or common ceramic material) as a ceramic material used for the ceramic layers. This decreases the difference in the contraction coefficient between the ceramic layers and each of the inner electrodes and the via-electrode during the firing process. The ratio (volume ratio) of the common material to a metal material included in the via-electrode may be higher than that in the inner electrodes. Typically, the contact area between the via-electrode and the ceramic layers is smaller than the contact area between the inner electrodes and the ceramic layers. The via-electrode is, thus, more vulnerable to the influence of the difference in the contraction coefficient during the firing process. Therefore, by setting a higher ratio of the common material included in the via-electrode than that in the inner electrodes, the difference in the contraction coefficient between the via-electrode and the ceramic layers is able to be decreased, thus reducing the occurrence of cracks and gaps in the electronic component and also preventing the via-electrode from detaching from or falling out of the electronic component.

According to another preferred embodiment of the present invention, a manufacturing method for a multilayer electronic component which includes first, second, and third ceramic layers sequentially stacked on each other, a first inner electrode sandwiched between the first and second ceramic layers, a second inner electrode sandwiched between the second and third ceramic layers, and a via-electrode that electrically connects the first and second inner electrodes, includes (A) a step of preparing the first ceramic layer including the first inner electrode on a top surface of the first ceramic layer; (B) a step of forming the via-electrode and the second ceramic layer on the first ceramic layer by repeating sub-steps (B-1) through (B-4) a predetermined number of times, the step (B) including (B-1) a sub-step of forming a first ceramic sub-layer on the first ceramic layer on which the first inner electrode is formed by supplying a ceramic material ink, the first ceramic sub-layer including a first hole corresponding to the via-electrode, (B-2) a sub-step of supplying a first conductive ink which forms the via-electrode at the first hole, the first conductive ink being supplied so as to contact the first inner electrode and to partially extend to outside a periphery of the first hole, (B-3) a sub-step of forming a second ceramic sub-layer on the first ceramic sub-layer including the first conductive ink by supplying a ceramic material ink, the second ceramic sub-layer including a second hole corresponding to the first hole of the first ceramic sub-layer, and (B-4) a sub-step of supplying a second conductive ink which forms the via-electrode at the second hole, the second conductive ink being supplied so as to contact the first conductive ink; (C) a step of forming the second inner electrode on the second ceramic layer, the second inner electrode extending to a position at which the second inner electrode will be connected to the via-electrode; and (D) a step of forming the third ceramic layer on the second ceramic layer on which the second inner electrode is formed.

By repeatedly performing forming of the first ceramic sub-layer, supplying of the first conductive ink, forming of the second ceramic sub-layer, and supplying of the second conductive ink as described above, a via-electrode including projections inserted into the second ceramic layer in a layered arrangement is easily formed.

The sub-steps (B-1) through (B-4) may preferably be performed by an inkjet process. In the inkjet process, very small droplets are ejected and applied to an object, thus making it possible to form the first and second ceramic sub-layers very thin and also to apply the first and second conductive inks to the object very thinly. That is, the projections, which are formed together with the via-electrode, are also able to be formed very thin. The projections are inserted into the second ceramic layer in a layered arrangement and with very small intervals so that they are able to be firmly fixed to the second ceramic layer. It is, thus, possible to more effectively reduce the occurrence of cracks and gaps between the via-electrode and the ceramic element. The inkjet process also enables droplets to be precisely ejected to desired positions without the need to prepare a pattern mask, thus facilitating the formation of a projection inserted between ceramic sub-layers in a layered arrangement. The first and third ceramic layers and the first and second inner electrodes may not necessarily be formed by the inkjet process, but may be formed by another process, such as screen printing or a transfer process.

According to multilayer electronic components of preferred embodiments of the present invention, a via-electrode and a ceramic element are engaged with each other due to the formation of a projection. This configuration reduces the deformation of the multilayer electronic component caused by the difference in the contraction coefficient during the firing process. It is, thus, possible to reduce the occurrence of cracks and breaks in the multilayer electronic components and gaps between the via-electrode and the ceramic element. The via-electrode is also less likely to detach from or fall out of the multilayer electronic component. As a result, multilayer electronic components with a stable quality are provided.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

First Preferred Embodiment

Figure 1:
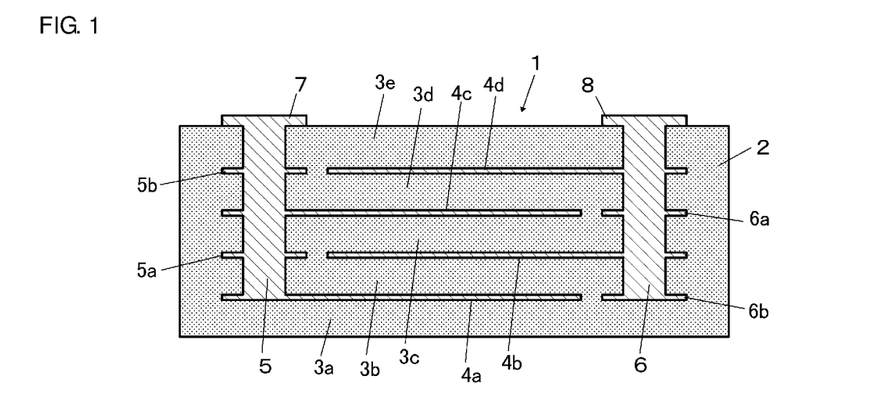
FIG. 1 is a schematic sectional view of a multilayer electronic component according to a first preferred embodiment of the present invention.

FIG. 1 illustrates a multilayer electronic component 1 according to a first preferred embodiment of the present invention. The multilayer electronic component 1 will simply be referred to as the electronic component 1. In the first preferred embodiment, a multilayer ceramic capacitor will be described as an example of the electronic component 1. The electronic component 1 includes an electronic component body 2. As shown in FIG. 1, in the electronic component body 2, a plurality of ceramic layers (dielectric layers) 3a through 3e made of a dielectric ceramic material are stacked on each other with a plurality (preferably four in the first preferred embodiment, for example) of inner electrodes 4a through 4d therebetween. The inner electrodes 4a and 4c extend toward the left side of the electronic component body 2 and are connected to a via-electrode 5. The via-electrode 5 is provided at the left side of the electronic component body 2 and passes therethrough in the thickness direction. The inner electrodes 4b and 4d extend towards the right side of the electronic component body 2 and are connected to a via-electrode 6. The via-electrode 6 is provided at the right side of the electronic component body 2 and passes therethrough in the thickness direction. An outer electrode 7 is provided on the top side of the via-electrode 5, and an outer electrode 8 is provided on the top side of the via-electrode 6. That is, the outer electrodes 7 and 8 are provided on the top surface of the electronic component body 2, which corresponds to the bottom surface when the electronic component 1 is mounted.

The outer electrodes 7 and 8 may not necessarily be provided only on the top surface of the electronic component body 2, and may be provided on both of the top and bottom surfaces of the electronic component body 2. Alternatively, the outer electrodes 7 and 8 may not necessarily be provided on the top and bottom surfaces. In the electronic component 1 shown in FIG. 1, no outer electrodes are provided on the side surfaces of the electronic component body 2. However, if the inner electrodes 4a and 4c extend to a side surface of the electronic component body 2 or if the inner electrodes 4b and 4d extend to the other side surface of the electronic component body 2, the corresponding via-electrode 5 or 6 may be omitted, and an outer electrode may be provided on the corresponding side surface. All of the drawings including FIG. 1 only schematically illustrate the elements, and the drawing scales of the sizes and the aspect ratios of the elements may be different from those of actual products.

When the inner electrode 4a corresponds to a first inner electrode, the inner electrode 4c corresponds to a second inner electrode, the ceramic layer 3a corresponds to a first ceramic layer, the ceramic layers 3b and 3c correspond to a second ceramic layer, and the ceramic layers 3d and 3e correspond to a third ceramic layer. When the inner electrode 4b corresponds to a first inner electrode, the inner electrode 4d corresponds to a second inner electrode, the ceramic layers 3a and 3b correspond to a first ceramic layer, the ceramic layers 3c and 3d correspond to a second ceramic layer, and the ceramic layer 3e corresponds to a third ceramic layer.

In the electronic component 1, a projection 5a is integrally provided outside the outer periphery of the via-electrode 5 such that it is inserted between the ceramic layers 3b and 3c in a layered arrangement. A projection 6a is integrally provided outside the outer periphery of the via-electrode 6 such that it is inserted between the ceramic layers 3c and 3d in a layered arrangement. A projection 5b is integrally provided outside the outer periphery of the via-electrode 5 such that it is inserted between the ceramic layers 3d and 3e in a layered arrangement. A projection 6b is integrally provided outside the outer periphery of the via-electrode 6 such that it is inserted between the ceramic layers 3a and 3b in a layered arrangement. The projections 5a, 5b, 6a, and 6b are each electrically insulated from a corresponding one of the inner electrodes 4a through 4d provided on the same layer. That is, the projections 5a, 5b, 6a, and 6b are separated from the corresponding inner electrodes 4a through 4d by a distance as small as possible in order to maintain a sufficient level of the electrical characteristics and the reliability.

Each of the projections 5a, 5b, 6a, and 6b preferably have a flat or a substantially flat shape such that the projecting length of the projections is longer than the thickness of the base portion near the corresponding via-electrode 5 or 6. The thickness of each of the projections 5a, 5b, 6a, and 6b may be uniform. Alternatively, the projections 5a, 5b, 6a, and 6b may be tapered from the base portions to the leading portions in a wedge shape. The configuration of the via-electrodes 5 and 6 in cross section may be any suitable shape, such as a circle or substantial circle, a quadrilateral, and an ellipse, for example. The configuration of the projections 5a, 5b, 6a, and 6b in a plan view may also be selected as desired. If each of the projections 5a, 5b, 6a, and 6b extend around the entire or substantially entire periphery of the corresponding via-electrode 5 or 6, they may be referred to as a flange. Although, in the electronic component 1 shown in FIG. 1, the lengths of the projections 5a, 5b, 6a, and 6b are preferably the same or substantially the same, they may be different from each other. The projections 5a, 5b, 6a, and 6b are vertically sandwiched between the corresponding ceramic layers 3a through 3e. In the electronic component 1, the projections 5a, 5b, 6a, and 6b and the ceramic layers 3a through 3e are engaged and in contact with each other. This configuration reduces the occurrence of breaks and cracks in circuits and gaps and cracks between the via-electrodes 5 and 6 and the ceramic layers 3a through 3e, and also prevents the via-electrodes 5 and 6 from detaching or falling out of the electronic component body 2, even with the difference in the contraction coefficient between the via-electrodes 5 and 6 and the ceramic layers 3a through 3e during the firing process.

In FIG. 1, the projections 5a, 5b, 6a, and 6b preferably extend perpendicularly or substantially perpendicularly to the axial direction of the via-electrodes 5 and 6. However, if the ceramic layers 3a through 3e are curved or tilt, the projections 5a, 5b, 6a, and 6b may also be curved or tilt accordingly. Although in FIG. 1 the thickness of the projections 5a, 5b, 6a, and 6b and that of the inner electrodes 4a through 4d are preferably the same or substantially the same, they may be different from each other. Although in FIG. 1 the inner electrodes 4a through 4d are preferably provided as four layers, they may be provided as two, three, or more than four layers. The inner electrodes 4a through 4d may not necessarily be plane electrodes (solid plane electrodes), and may be a circuit pattern, instead. That is, the electronic component 1 may not be a capacitor and may be any type of electronic component.

A non-limiting example of a manufacturing method for the electronic component 1 according to a preferred embodiment of the present invention will be discussed below with reference to FIGS. 2A through 2G. In this case, a manufacturing method for only the left half of the electronic component 1 shown in FIG. 1 will be described by using FIGS. 2A through 2G.

Figure 2A:
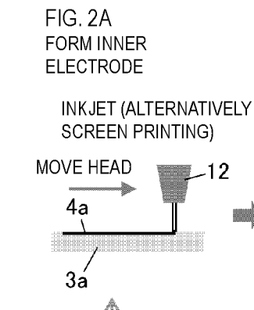
FIGS. 2A through 2G illustrate an example of a manufacturing method for the multilayer electronic component shown in FIG. 1.

As shown in FIG. 2A, the inner electrode 4a is first formed on the top surface of the ceramic layer 3a. At this stage, the ceramic layer 3a is not yet fired. The ceramic layer 3a may preferably be formed by an inkjet process using a ceramic material ink, for example, which will be discussed below. The ceramic layer 3a may alternatively be formed by a film deposition process. For example, a ceramic layer may be deposited on a carrier film using a die coater. In FIG. 2A, the inner electrode 4a is formed by moving an inkjet head 12 in parallel or substantially in parallel with the ceramic layer 3a while ejecting a conductive ink from the inkjet head 12. Alternatively, the inner electrode 4a may be formed by screen printing for applying a conductive paste to the ceramic layer 3a.

Figure 2B:
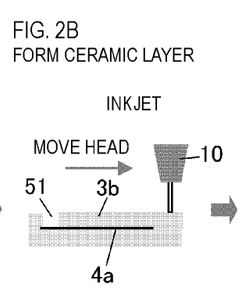

Then, as shown in FIG. 2B, the ceramic layer 3b is formed on the ceramic layer 3a by the inkjet process. More specifically, a predetermined thickness of the ceramic layer 3b is formed by moving an inkjet head 10 in parallel or substantially in parallel with the ceramic layer 3a while ejecting a ceramic material ink from the inkjet head 10. In this case, the ceramic layer 3b is formed such that a first hole 51 is formed at a position at which the via-electrode 5 will be provided. After the ceramic layer 3b is formed, it may preferably be dried or solidified.

Figure 2C:
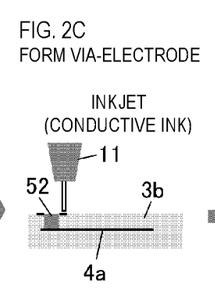

Then, as shown in FIG. 2C, a first conductive ink 52 is supplied to the first hole 51 by an inkjet head 11. In this case, the first conductive ink 52 is supplied so as to fill the first hole 51 and contact the inner electrode 4a and to partially extend to outside the outer periphery of the first hole 51. That is, the first conductive ink 52 partially extends from the top surface of the ceramic layer 3b. The amount by which the first conductive ink 52 extends to the outside the first hole 51 may be determined as desired by positioning control of the inkjet head 11. After the first conductive ink 52 is supplied to the first hole 51, it may preferably be dried or solidified.

Figure 2D:
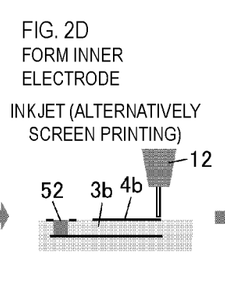

Then, as shown in FIG. 2D, the inner electrode 4b is formed on the ceramic layer 3b by the inkjet process. More specifically, the inner electrode 4b is formed by moving the inkjet head 12 in parallel or substantially in parallel with the ceramic layer 3b while ejecting a conductive ink from the inkjet head 12. The inner electrode 4b is formed to be separated from the first conductive ink 52 with a spacing therebetween. The composition of the conductive ink for the inner electrodes 4a and 4b ejected from the inkjet head 12 may be different from that of the conductive ink for the via-electrode 5 ejected from the inkjet head 11. As in the inner electrode 4a, the inner electrode 4b may alternatively be formed by screen printing for applying a conductive paste to the ceramic layer 3b.

Figure 2E:
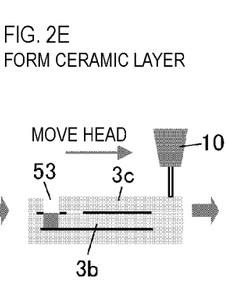

Then, as shown in FIG. 2E, the ceramic layer 3c is formed on the ceramic layer 3b by the inkjet process. More specifically, a predetermined thickness of the ceramic layer 3c is formed by moving the inkjet head 10 in parallel or substantially in parallel with the ceramic layer 3b while ejecting a ceramic material ink from the inkjet head 10. In this case, the ceramic layer 3c is formed such that a second hole 53 is formed at a position at which the via-electrode 5 will be provided. After the ceramic layer 3c is formed, it may preferably be dried or solidified.

Figure 2F:
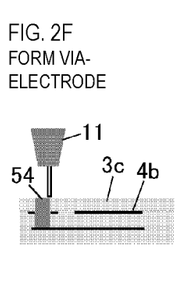

Then, as shown in FIG. 2F, a second conductive ink 54 is supplied to the second hole 53 by the inkjet head 11. In this case, the second conductive ink 54 is supplied to fill the second hole 53 and to contact the inner electrode 4a. However, the second conductive ink 54 does not need to extend to outside the periphery of the second hole 53. After the second conductive ink 54 is supplied to the second hole 53, it may preferably be dried or solidified.

Figure 2G:
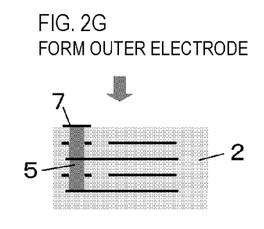

Thereafter, by repeating the steps in FIGS. 2A through 2F, a predetermined multilayer structure is constructed. Then, the outer electrode 7 is formed, as shown in FIG. 2G. As a result, the electronic component body 2 is fabricated. Although the outer electrode 7 is preferably formed by the inkjet process in this example, it may be formed by another process, such as screen printing, for example. The electronic component body 2 is then fired at a predetermined temperature so that the ceramic layers 3a through 3e are sintered and the via-electrode 5 is baked. As a result, the electronic component 1 shown in FIG. 1 is fabricated. The outer electrodes 7 and 8 may be plated if necessary so as to form a conductive coating thereon.

The ceramic material used to make the ceramic layers 3a through 3e preferably includes resin and solvent components in addition to a ceramic component. The ceramic layers 3a through 3e thus contract when they are sintered. Similarly, the conductive ink used to make the via-electrodes 5 and 6 preferably includes a nonmetal material, such as resin and solvent components, in addition to a metal material. The via-electrodes 5 and 6 thus contract when they are baked. The contraction coefficient of the ceramic layers 3a through 3e and that of the via-electrodes 5 and 6 are different from each other. In the preferred embodiments of the present invention, the projections 5a and 5b are provided outside the outer periphery of the via-electrode 5, and the projections 6a and 6b are provided outside the outer periphery of the via-electrode 6. The projections 5a, 5b, 6a, and 6b are inserted between the corresponding ceramic layers 3a through 3e in a layered arrangement, so that the projections 5a, 5b, 6a, and 6b and the ceramic layers 3a through 3e are firmly engaged with each other. With this configuration, although the contraction coefficient of the ceramic layers 3a through 3e and that of the via-electrodes 5 and 6 during the firing process are different from each other, the via-electrodes 5 and 6 do not detach from come out of the holes provided in the ceramic layers 3a through 3e, and cracks in the ceramic layers 3a through 3e are also reduced or prevented. The conductive ink used for the via-electrodes 5 and 6 may preferably include the same ceramic material (common material) as that of the ceramic layers 3a through 3e. Then, the difference in the contraction coefficient between the via-electrodes 5 and 6 and the ceramic layers 3a through 3e is decreased.

The material used to make the inner electrodes 4a through 4d and the outer electrodes 7 and 8 and that of the via-electrodes 5 and 6 do not have to be the same. The volume ratio of a nonmetal material to a metal material included in the via-electrodes 5 and 6 may preferably be higher than that of a nonmetal material to a metal material included in the inner electrodes 4a through 4d and/or the outer electrodes 7 and 8. When electrodes are formed by the inkjet process, a sufficient level of droplet fluidity is required to eject very small droplets. Thus, the volume ratio of a nonmetal material (resin binder, for example) included in the electrodes is required to be higher than that when the electrodes are formed by a process other than the inkjet process (screen printing using a conductive paste, for example). Because of this reason, the contraction coefficient of the via-electrodes 5 and 6 during the firing process becomes higher, and thus, cracks and gaps are more likely to be produced between the via-electrodes 5 and 6 and the ceramic layers 3a through 3e. From this viewpoint, providing the projections 5a, 5b, 6a, and 6b according to the preferred embodiments of the present invention is more effective when the via-electrodes 5 and 6 are formed by the inkjet process. However, providing the projections 5a, 5b, 6a, and 6b is still effective when the via-electrodes 5 and 6 are formed by screen printing using a conductive paste, for example.

If the volume ratio of the same ceramic material (common material) used for the ceramic layers 3a through 3e to a metal material included in the via-electrodes 5 and 6 is higher than that in the inner electrodes 4a through 4d and/or the outer electrodes 7 and 8, the difference in the contraction coefficient between the via-electrodes 5 and 6 and the ceramic layers 3a through 3e is decreased to an even smaller level. Cracks are thus less likely to occur in the ceramic layers 3a through 3e. More specifically, if calcium zirconate ($CaZrO_3$) ceramic is used for the ceramic layers 3a through 3e, a material including $CaZrO_3$ ceramic may preferably be used for the via-electrodes 5 and 6 as the common material in addition to a metal material. For example, if the volume ratio of the common material included in the inner electrodes 4a through 4d and/or the outer electrodes 7 and 8 is about 20 vol % or lower, the volume ratio of the common material included in the via-electrodes 5 and 6 is preferably about 30 vol % to about 70 vol % of the overall material forming the via-electrodes 5 and 6.

Second Preferred Embodiment

Figure 3:
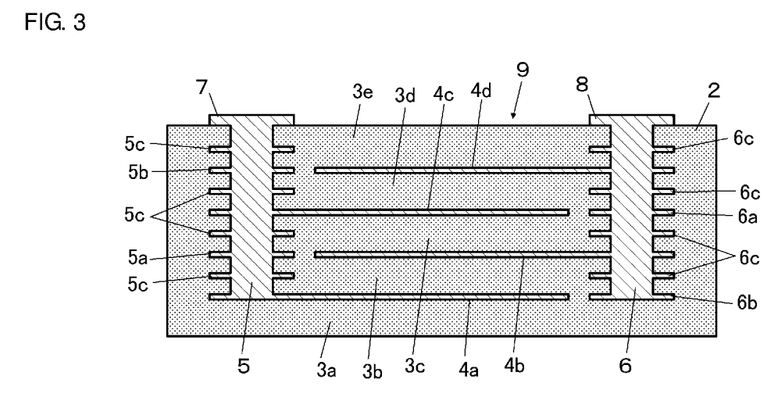
FIG. 3 is a schematic sectional view of a multilayer electronic component according to a second preferred embodiment of the present invention.

FIG. 3 illustrates a multilayer electronic component 9 according to a second preferred embodiment of the present invention. The multilayer electronic component 9 will simply be referred to as the electronic component 9. The same elements as those shown in FIG. 1 or elements corresponding to those shown in FIG. 1 are designated by the same reference numerals, and the same explanation will not be repeated.

In the first preferred embodiment shown in FIG. 1, the projections 5a and 5b of the via-electrode 5 and the projections 6a and 6b of the via-electrode 6 are provided on the same layers, that is, on the same levels, as the corresponding inner electrodes 4a through 4d. In the second preferred embodiment shown in FIG. 3, in addition to the projections 5a, 5b, 6a, and 6b provided on the same layers (on the same levels) as the inner electrodes 4a through 4d, projections 5c and 6c are also provided on different levels from the inner electrodes 4a through 4d. That is, at least one projection 5c and at least one projection 6c are interposed between the corresponding two of the inner electrodes 4a through 4d. In the second preferred embodiment, as in the first preferred embodiment, the projections 5a through 5c and 6a through 6c are each inserted between the corresponding ceramic layers 3a through 3e in a layered arrangement, thus increasing the coupling force between the via-electrodes 5 and 6 and the ceramic layers 3a through 3e. In particular, the addition of the projections 5c and 6c on the different levels from the inner electrodes 4a through 4d increases the contact area between the via-electrodes 5 and 6 and the ceramic layers 3a through 3e, thus further improving the coupling force therebetween. It is thus possible to more effectively reduce the occurrence of cracks and gaps in the electronic component 9 and also to prevent the via-electrodes 5 and 6 from detaching from or falling off, which would be caused by the difference in the contraction coefficient between the ceramic layers 3a through 3e and the via-electrodes 5 and 6 during the firing process.

Although in FIG. 3 only one projection 5c and only one projection 6c are provided in a layered arrangement between the corresponding two inner electrodes, a plurality of projections 5c and/or a plurality of projections 6c may be provided between the corresponding two inner electrodes. That is, if one ceramic layer between adjacent inner electrodes is provided in a multilayer structure defined by a plurality of ceramic sub-layers, a plurality of projections 5c and/or a plurality of projections 6c may be inserted between the corresponding ceramic layers.

Figure 4A:
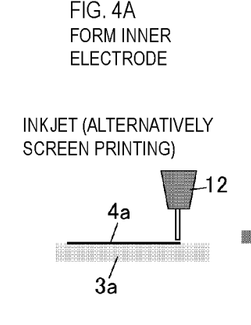
FIGS. 4A through 4G illustrate an example of a manufacturing method for the multilayer electronic component shown in FIG. 3.

A non-limiting example of a manufacturing method for the electronic component 9 according to a preferred embodiment of the present invention will be described below with reference to FIGS. 4A through 4G. As shown in FIG. 4A, the inner electrode 4a is first formed on the top surface of the ceramic layer 3a. This step is similar to that in FIG. 2A.

Figure 4B:
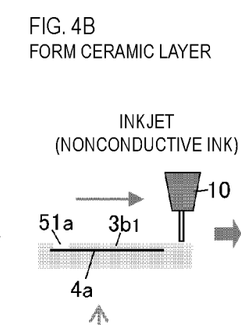

Then, as shown in FIG. 4B, a ceramic sub-layer 3b1 forming a portion of the ceramic layer 3b is formed on the ceramic layer 3a by the inkjet process. Although this step is similar to that in FIG. 2B, the thickness of each ceramic sub-layer is smaller than that of the ceramic layer 3b in FIG. 2B. A first hole 51a is formed in the ceramic sub-layer 3b1 at a position at which the via-electrode 5 will be provided.

Figure 4C:
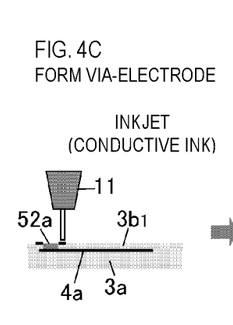

Then, as shown in FIG. 4C, a first conductive ink 52a is supplied to the first hole 51a by the inkjet head 11. In this case, preferably, the first conductive ink 52a is supplied so as to fill the first hole 51a and contact the inner electrode 4a and to partially extend to outside the periphery of the first hole 51a. That is, the first conductive ink 52 partially extends from the top surface of the ceramic sub-layer 3b1.

Figure 4D:
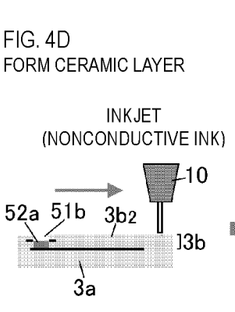

Then, as shown in FIG. 4D, a ceramic sub-layer 3b2 is formed on the ceramic sub-layer 3b1 by the inkjet process. In this case, the ceramic sub-layer 3b2 is preferably formed such that a second hole 51b is formed and superposed on the first hole 51a. By forming the ceramic sub-layer 3b2, the extending portion of the first conductive ink 52a to the outside the first hole 51a is sandwiched between the ceramic sub-layers 3b1 and 3b2, and serves as a projection. The two ceramic sub-layers 3b1 and 3b2 form the single ceramic layer 3b.

Figure 4E:
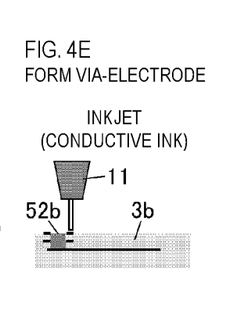

Then, as shown in FIG. 4E, a second conductive ink 52b is supplied to the second hole 51b by the inkjet head 11. In this case, the second conductive ink 52b is preferably supplied so as to fill the second hole 51b and contact the first conductive ink 52a and to partially extend to outside the periphery of the second hole 51b.

Figure 4F:
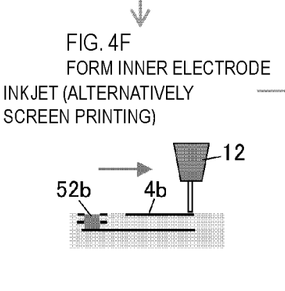

Then, as shown in FIG. 4F, the inner electrode 4b is formed on the ceramic layer 3b. The inner electrode 4b is formed to be separated from the second conductive ink 52b with a spacing therebetween. In FIG. 4F, the inner electrode 4b is preferably formed by the inkjet process using a conductive ink. However, the inner electrode 4b may alternatively be formed by screen printing or a transfer process for applying a conductive paste to the ceramic layer 3b.

Figure 4G:
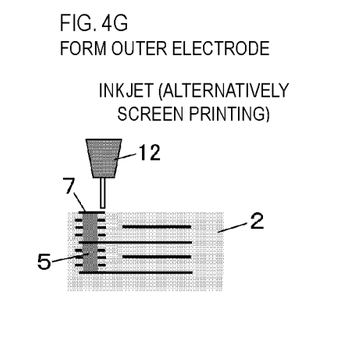

Thereafter, by repeating steps similar to those in FIGS. 4B through 4F, a predetermined multilayer structure is constructed. Then, the outer electrode 7 is formed, as shown in FIG. 4G. As a result, the electronic component body 2 is fabricated. The electronic component body 2 is then fired at a predetermined temperature so that the ceramic layers 3a through 3e are sintered and the conductive ink is baked. As a result, the electronic component 9 shown in FIG. 3 has been fabricated.

Examples of the dimensions of the electronic component 9 (multilayer ceramic capacitor), the inner electrodes 4a through 4d, and the via-electrodes 5 and 6 are provided below. In the multilayer ceramic capacitor configured as described above, it is possible to reduce the occurrence of cracks and gaps in the multilayer ceramic capacitor and also to prevent the via-electrodes 5 and 6 from detaching from or falling off, which would be caused by the difference in the contraction coefficient between the ceramic layers 3a through 3e and the via-electrodes 5 and 6.

Dimensions of multilayer ceramic capacitor: about 8 mm×about 6 mm×about 4 mm

Thickness of inner electrodes: about 0.3 μm to about 10 μm

Diameter of via-electrodes: about 30 μm to about 5 mm

Thickness of projections: about 0.5 μm to about 20 μm

Length of projections: about 2 μm to about 400 μm

Figure 5:
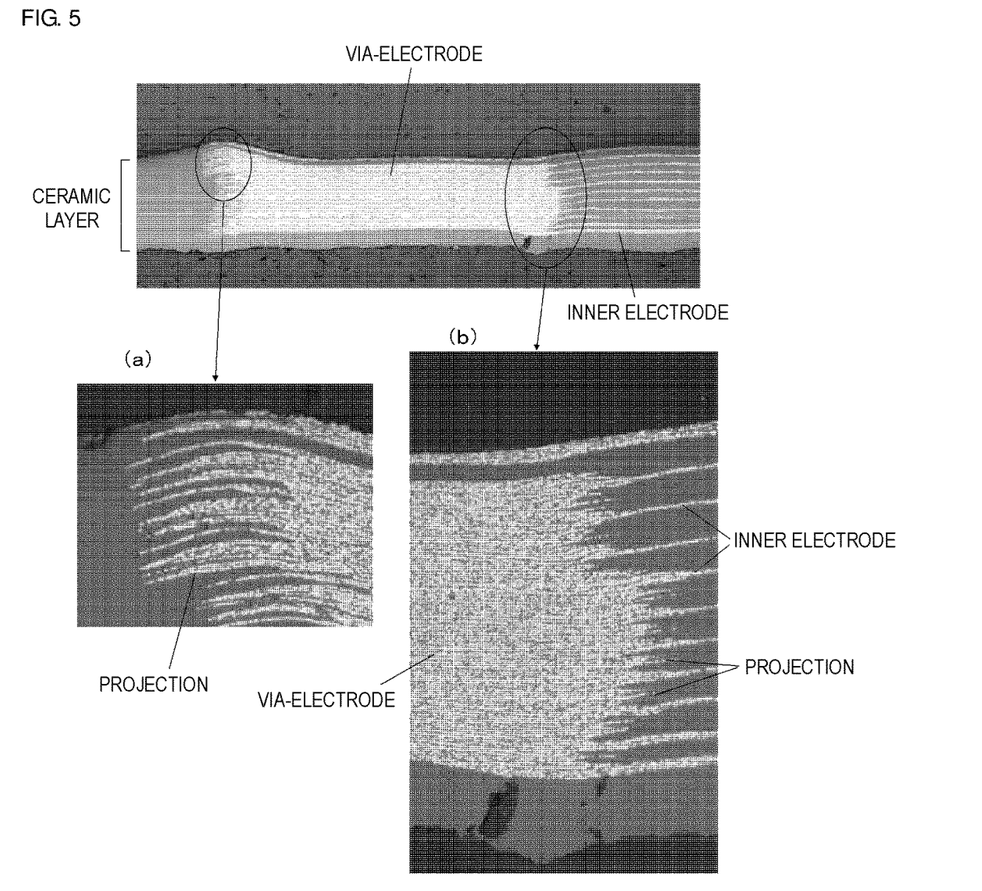
FIG. 5 illustrates sectional photo images of a multilayer electronic component including a via-electrode that is formed according to a method of a preferred embodiment of the present invention.

FIG. 5 illustrates sectional photo images of a multilayer electronic component including a via-electrode formed according to a method of a preferred embodiment of the present invention. The long portions extending from the via-electrode to the right side are inner electrodes. The short portions extending from the via-electrode to the left and right sides are projections. Portion (b) of FIG. 5 shows that a plurality of projections extend between the inner electrodes and also that the lengths of the projections are different. Some projections are formed in a substantial wedge shape such that they are tapered from the base portions to the leading portions. Portion (a) of FIG. 5 shows that some projections are curved in accordance with the curved shape of the corresponding ceramic layers on the left side of the via-electrode. Some projections project obliquely with respect to the planes of the inner electrodes. That is, it is not necessary that the projections project perpendicularly or substantially perpendicularly to the axial direction of the via-electrode. It is validated from FIG. 5 that forming of the via-electrode including a plurality of projections prevents the occurrence of cracks and gaps between the ceramic layers and the via-electrode during the firing process.

Figure 6:
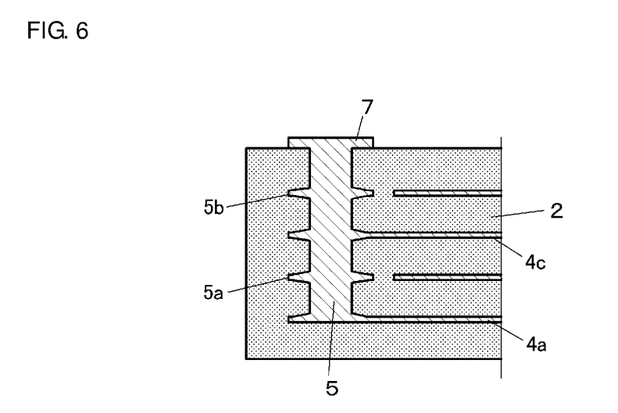
FIG. 6 is a schematic sectional view of an example of a multilayer electronic component including a via-electrode.

FIG. 6 is a schematic sectional view of an example of a multilayer electronic component including a via-electrode formed according to a method of a preferred embodiment of the present invention. In this example, the projections 5a and 5b projecting toward the outer peripheral direction of the via-electrode 5 are preferably tapered such that the thickness of the projections 5a and 5b progressively decreases from the base portions to the leading portions. This configuration is effective to reduce cracks and breaks in the base portions of the projections 5a and 5b, which would be caused by the difference in the contraction coefficient between the via-electrode 5 and a ceramic element 2 during the firing process. The thickness of the connecting portions of the inner electrodes 4a and 4c with the via-electrode 5 may preferably be thicker than the other portions thereof. This configuration increases the strength of the connecting portions between the inner electrodes 4a and 4c and the via-electrode 5. It is thus possible to effectively reduce breaks and cracks in the portions between the inner electrodes 4a and 4c and the via-electrode 5, which would be caused by the difference in the contraction coefficient between the via-electrode 5 and the ceramic element 2 during the firing process.

The above-described preferred embodiments merely illustrate some examples of the present invention, and may be modified without departing from the scope and spirit of the present invention. In the above-described preferred embodiments, a multilayer ceramic capacitor has been described as an example. However, the present invention may be applicable to other elements such as a coil, a piezoelectric element, a thermistor, and a multilayer substrate, for example. In above-described preferred embodiments, a dielectric material is used for the ceramic layers. The ceramic layers may alternatively be made of a magnetic material, a piezoelectric material, or a thermistor material, for example. The metal material used for the inner electrodes, the outer electrodes, and the via-electrodes may preferably be Ni, Ag, Pd, Au, or Cu or an alloy including some of these metals as a primary component. The portion of the projection made of the common material (ceramic material) may be connected to the ceramic layers above and below the projection.

In FIGS. 2A through 2G and 4A through 4G, preferably, the ceramic layers 3b and 3c are formed by the inkjet process, and the via-electrode 5 is also formed by the inkjet process using the first and second conductive inks 52 and 54. However, another process may be used. For example, a ceramic layer may be formed on a carrier film by a film deposition process, and a portion of the via-electrode 5 may be formed by screen printing using the first conductive ink 52. Then, a ceramic layer formed on another carrier film may be transferred onto the first conductive ink 52, and then, a portion of the via-electrode 5 may be formed by screen printing using the second conductive ink 54.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer electronic component, comprising:
   first, second, and third ceramic layers sequentially stacked on each other;
   a first inner electrode sandwiched between the first and second ceramic layers;
   a second inner electrode sandwiched between the second and third ceramic layers; and
   a via-electrode that electrically connects the first and second inner electrodes; wherein
   a projection is integrally provided with the via-electrode, the projection projecting from the via-electrode towards an outer peripheral direction and extending into the second ceramic layer in a layered arrangement; and
   the projection has a wedge or substantial wedge shape such that a thickness of the projection decreases from a base portion to a leading portion of the projection.

2. The multilayer electronic component according to claim 1, wherein the projection is curved from a base portion to a leading portion of the projection.

3. The multilayer electronic component according to claim 1, wherein a ratio of a common material to a metal material included in the via-electrode is higher than a ratio of the common material to a metal material included in the first and second inner electrodes, the common material being included in common with the first, second, and third ceramic layers.

4. The multilayer electronic component according to claim 1, further comprising an outer electrode provided on an outer surface of the multilayer electronic component and connected to the via-electrode.

5. The multilayer electronic component according to claim 1, wherein the projection has a flat or a substantially flat shape.

6. The multilayer electronic component according to claim 1, wherein the projection is defined by a flange that extends around an entire or substantially entire periphery of the via-electrode.

7. The multilayer electronic component according to claim 1, wherein the projection is sandwiched between the first and second ceramic layers.

8. The multilayer electronic component according to claim 1, wherein the projection extends perpendicularly or substantially perpendicularly to an axial direction of the via-electrode.

9. The multilayer electronic component according to claim 1, wherein the first and second inner electrodes are solid plane electrodes.

10. The multilayer electronic component according to claim 1, wherein the multilayer electronic component is a capacitor.

11. The multilayer electronic component according to claim 1, wherein the first and second inner electrodes and the via-electrode include at least one of Ni, Ag, Pd, Au, or Cu or an alloy including at least two of Ni, Ag, Pd, Au, or Cu as a primary component.

12. A multilayer electronic component comprising:
first, second, and third ceramic layers sequentially stacked on each other;
a first inner electrode sandwiched between the first and second ceramic layers;
a second inner electrode sandwiched between the second and third ceramic layers; and
a via-electrode that electrically connects the first and second inner electrodes; wherein
a projection is integrally provided with the via-electrode, the projection projecting from the via-electrode towards an outer peripheral direction and extending into the second ceramic layer in a layered arrangement; and
a projecting length of the projection is greater than a thickness of a base portion of the projection.

13. A multilayer electronic component comprising:
first, second, and third ceramic layers sequentially stacked on each other;
a first inner electrode sandwiched between the first and second ceramic layers;
a second inner electrode sandwiched between the second and third ceramic layers; and
a via-electrode that electrically connects the first and second inner electrodes; wherein
a projection is integrally provided with the via-electrode, the projection projecting from the via-electrode towards an outer peripheral direction and extending into the second ceramic layer in a layered arrangement; and
the projection projects obliquely with respect to planes of the first and second inner electrodes.

* * * * *